INVENTOR
JOSEPH A. ROGUS
Baldwin, Doran & Egan
ATTORNEYS

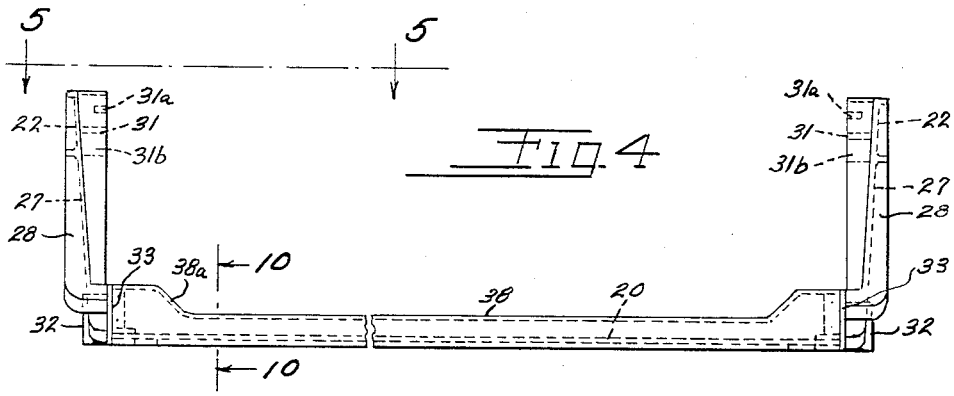
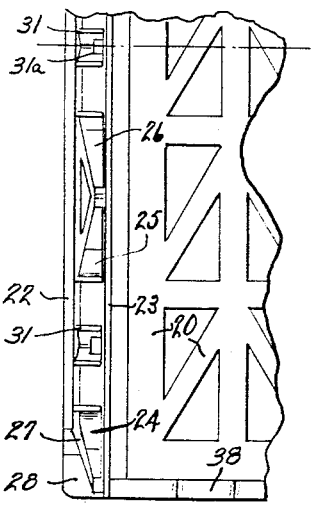
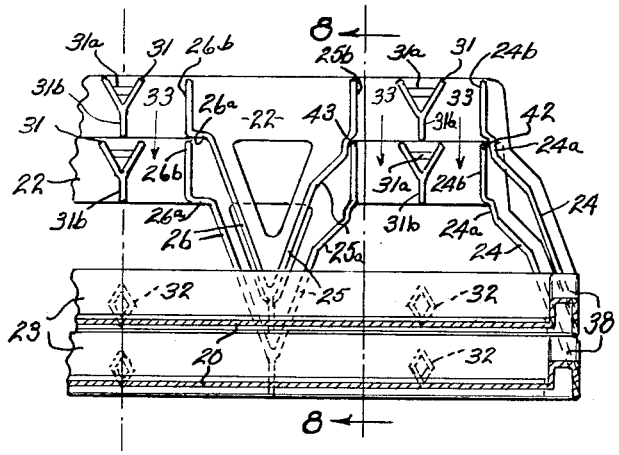
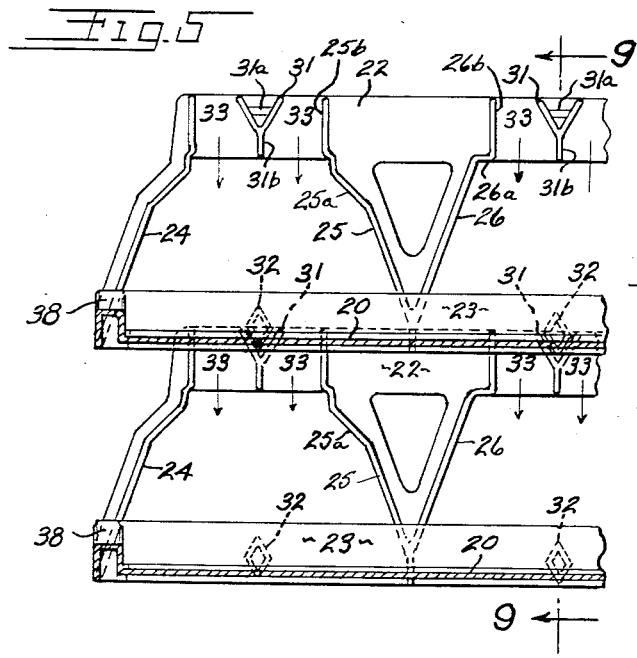
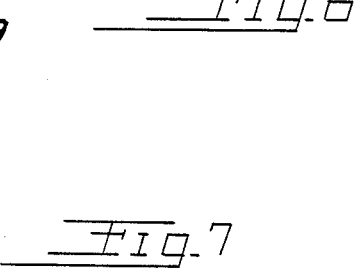

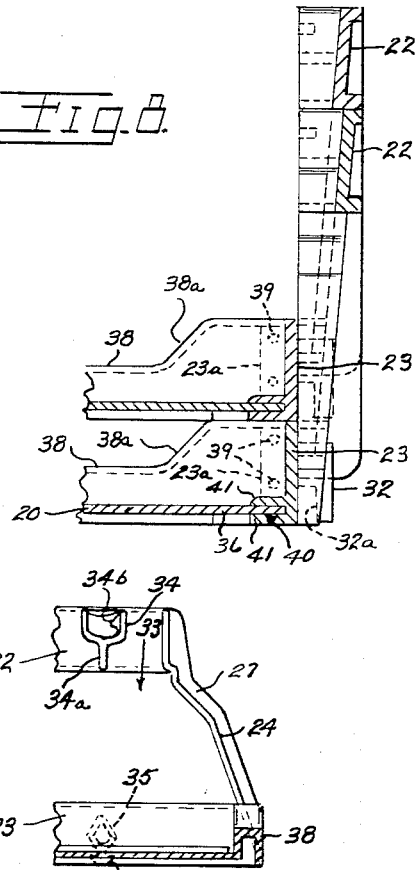

Oct. 15, 1968 J. A. ROGUS 3,405,810
TIERABLE AND NESTABLE RECEPTACLE
Filed Sept. 22, 1966 6 Sheets-Sheet 4
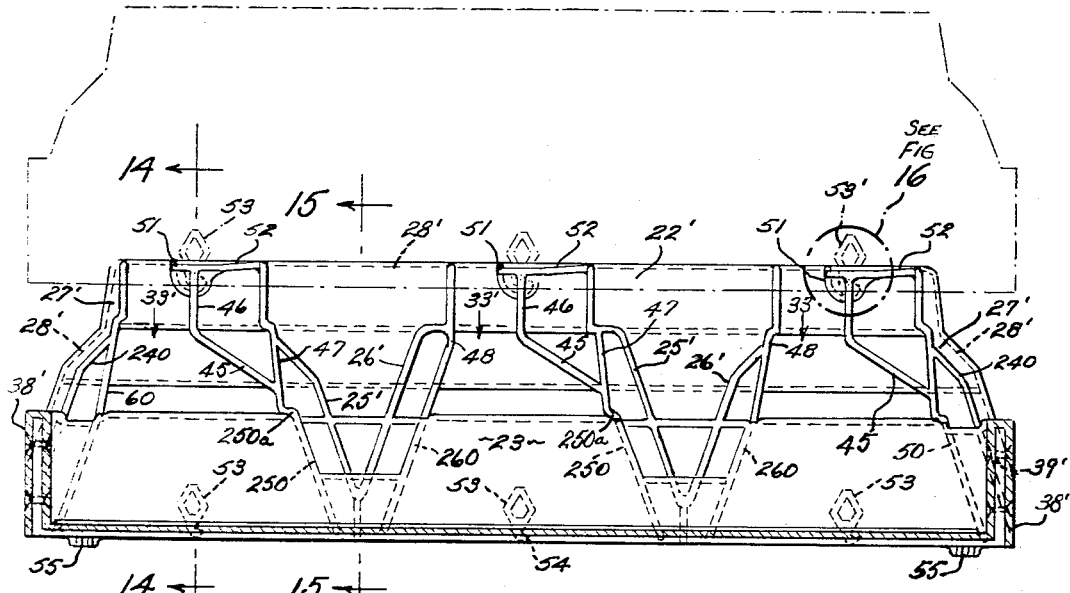
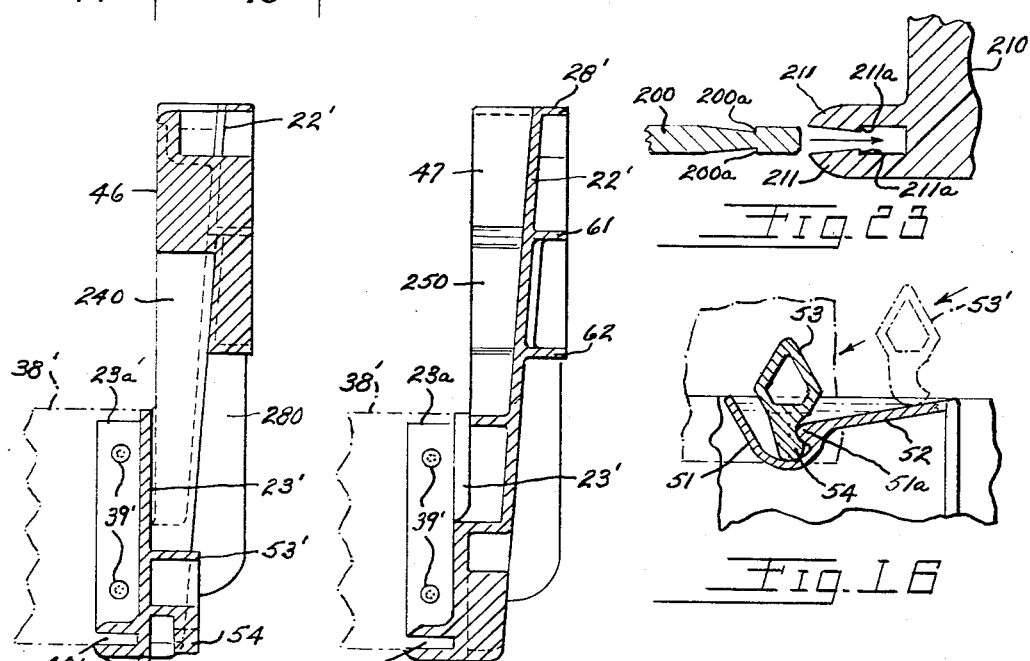
INVENTOR
JOSEPH A. ROGUS
BY
Baldwin, Doran & Egan
ATTORNEYS

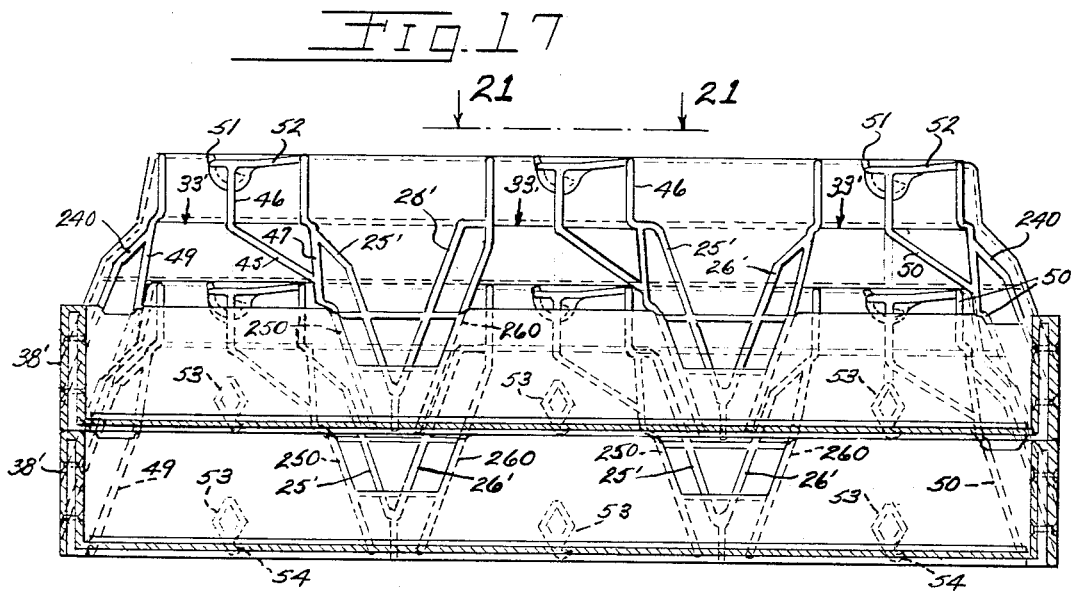
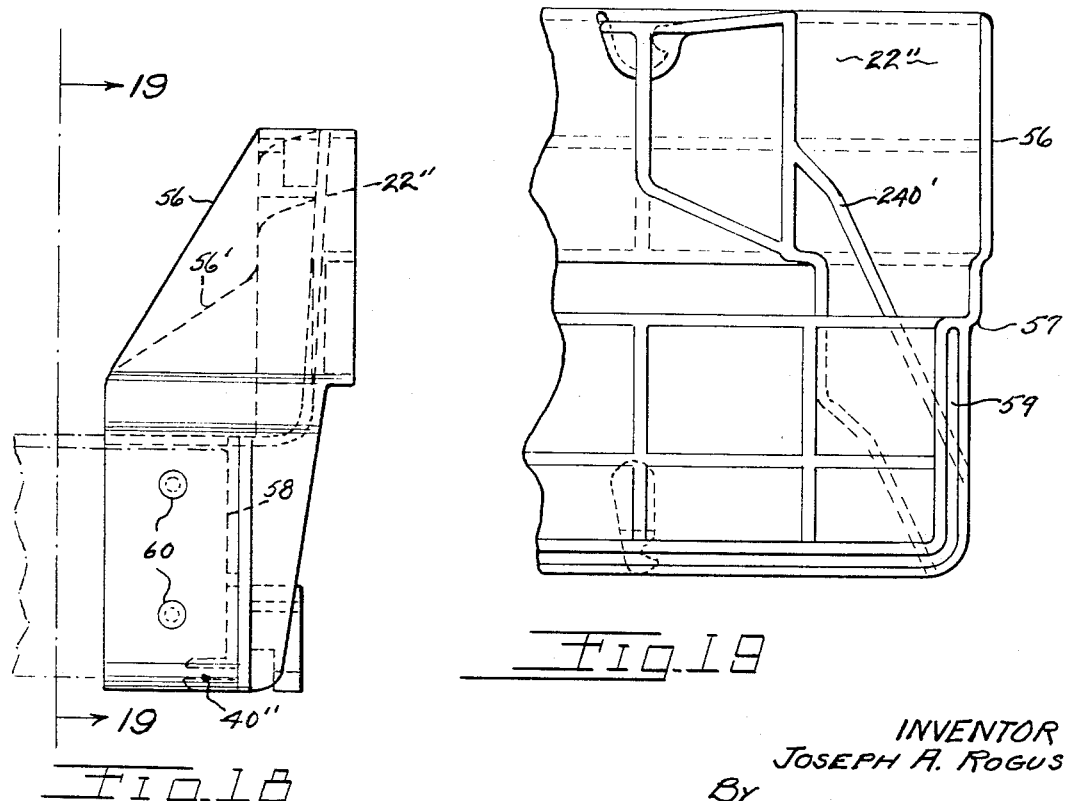

Oct. 15, 1968  J. A. ROGUS  3,405,810
TIERABLE AND NESTABLE RECEPTACLE
Filed Sept. 22, 1966  6 Sheets—Sheet 6
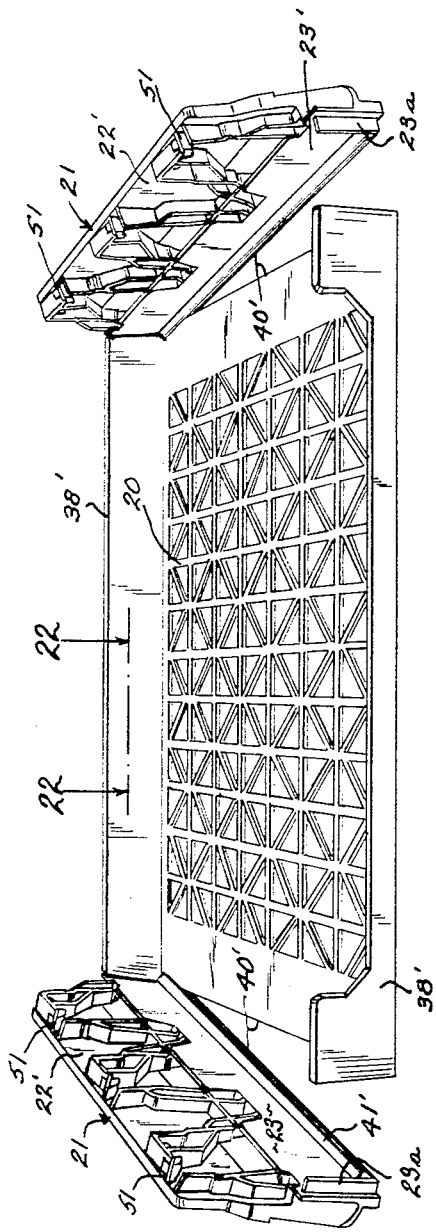
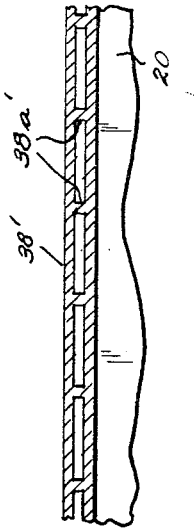
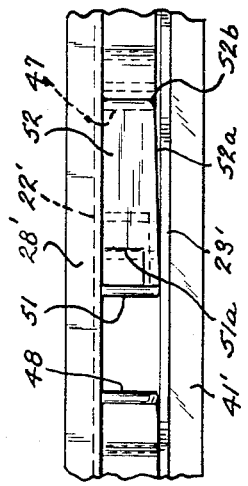
INVENTOR.
JOSEPH A. ROGUS
BY
Baldwin, Doran & Egan
ATTORNEYS

****

United States Patent Office 3,405,810
Patented Oct. 15, 1968

3,405,810
TIERABLE AND NESTABLE RECEPTACLE
Joseph A. Rogus, Willowick, Ohio, assignor to Mid-West Metallic Products, Inc., Cleveland, Ohio, a corporation of Ohio
Filed Sept. 22, 1966, Ser. No. 581,317
19 Claims. (Cl. 211—126)

ABSTRACT OF THE DISCLOSURE

A tiering and nesting receptable is made of plastic, or the like, with a bottom and two generally parallel side walls; the side walls having vertically registering tiering support members at the top, on the inside, and at the bottom, on the outside. These support members interlock when two receptacles are stacked. In one embodiment a generally horizontal slide is inclined toward each upper tiering support member to guide the coacting lower support member into engagement. The side walls are reinforced at the end by inclined end flanges, and at intermediate points by V-shape flanges opening upwardly. A clearway is provided between each upper tiering support member and an adjacent V-shape flange permitting an upper receptacle to pass downwardly to a nested position in a lower receptacle and insuring that like V-shape flanges on the two receptacles interengage to guide the upper receptacle to registering alignment in the lower one. In one embodiment a unitary bottom is joined along parallel edges to two unitary side walls.

---

This invention relates to improvements in a receptacle which is tierable and nestable with another like receptacle.

One of the objects of the present invention is to provide a recepacle of the type described having a generally planar bottom and opposite parallel side wall members of generally vertically extending thin flat material, these side wall members having thin flange members extending at right angles from the side wall members and rigid therewith so as to reinforce the side wall members in a special manner.

Other novel features of this invention include the inclination of the reinforcing flange members from top to bottom longitudinally of the associated side wall member for the purpose of guiding an upper receptacle downwardly into a lower like receptable to a nested position. In a special form of the flange members, they are V-shape and the V-shape flange member of an upper receptacle nests downwardly into the similar member of the lower receptacle so as to guide the upper receptacle either direction longitudinally in the lower receptacle to a nesting position. The side wall members of this improved receptacle are strengthened inasmuch as the above mentioned V-shape flange members together with end flange members included downwardly and outwardly at opposite ends of each side wall member create together with longitudinal strips near the top and bottom of the side wall member a generally truss-like structure which is very strong.

Another novel feature of the improved receptacle is the provision of upper tiering support members on the inside of the associated side wall member and lower tiering support members on the outside thereof, together with the side wall member being inclined upwardly and outwardly from the bottom of the receptacle sufficiently to position these upper support members directly vertically above the coacting lower support members.

Further novelty in this invention lies in the coaction between the upper and lower tiering support members which include structural features whereby when two like receptacles are tiered, the engagement of the lower support members of the upper receptacle in the upper support members of the lower receptacle prevent spreading of the side wall members laterally outwardly, Also, an arrangement is provided whereby the upper support members may hook into the lower support members of a co-acting receptacle tiered above making it difficult for two tiered receptacles to be separated unintentionally.

Other objects and advantages of the present invention will be apparent from the accompanying drawings and description and the essential featrues will be set forth in the attached claims.

In the drawings—

FIG. 4 is an end elevational view of the same taken from the line 4—4 of FIG. 2;

FIG. 5 is a fragmental top plan view taken from the position of the line 5—5 of FIG. 4;

FIG. 6 is a sectional view taken in the same general position as FIG. 3 showing two like receptacles in nested position;

FIG. 7 is a view of the same two receptacles in a tiered position;

FIG. 8 is a sectional view of two nested receptacles taken along the line 8—8 of FIG. 6;

FIG. 9 is a sectional view of two tiered receptacles taken along the line 9—9 of FIG. 7;

FIG. 10 is a sectional view, enlarged, taken along the line 10—10 of FIG. 4;

FIG. 11 is a view like the right-hand end of FIG. 2 but showing modified upper and lower tiering support members;

FIG. 12 is a fragmental sectional view, enlarged, showing the tiering support members of FIG. 11 engaged in tiering position;

FIG. 13 is a sectional view of a modified receptacle, this view being taken from a position similar to that in FIG. 3 and with a tiered receptacle shown in dot-dash lines;

FIGS. 14 and 15 are sectional views, enlarged, taken along similarly numbered lines of FIG. 13;

FIG. 16 is a view, enlarged, giving a better view of two mutually engaged upper and lower tiering support members as encircled in FIG. 13, with the lower tiering support member of the upper receptacle shown in dot-dash lines in a position preliminary to tiered position;

FIG. 17 is a sectional view showing two of the receptacles of FIG. 13 in nested position;

FIG. 18 is an end view of a receptacle similar to that shown in FIGS. 13, 14 and 15 but modified to show a reinforcing member between the side wall and the attached bottom and end edge wall of the bottom;

FIG. 19 is a fragmental view of the end portion of the side wall taken from the position of the line 19—19 of FIG. 18;

FIG. 20 is an exploded perspective view of the receptacle shown in FIGS. 13 through 17 indicating how the two side wall members, which are mirror images of each other, are assembled with the bottom member so that it requires only three parts to make the entire receptacle;

FIG. 21 is a fragmental top plan view, enlarged, taken from the position of the line 21—21 of FIG. 17;

FIG. 22 is a fragmental sectional view, enlarged, taken along the line 22—22 of FIG. 20; while FIG. 23 is a fragmental sectional view taken in the same position as the similar parts shown at the bottom of FIGS. 14 and 15 and indicating an enlarged view of a modified connection between the bottom member and the side wall member of the receptacle.

Figure 1:
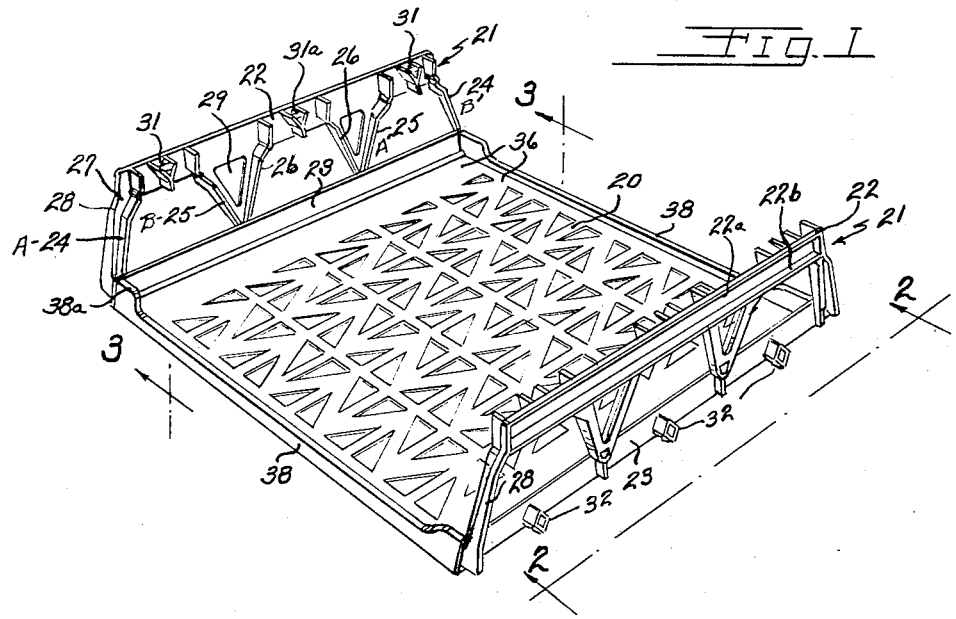
FIG. 1 is a perspective view of one embodiment of this invention.
Figure 2:
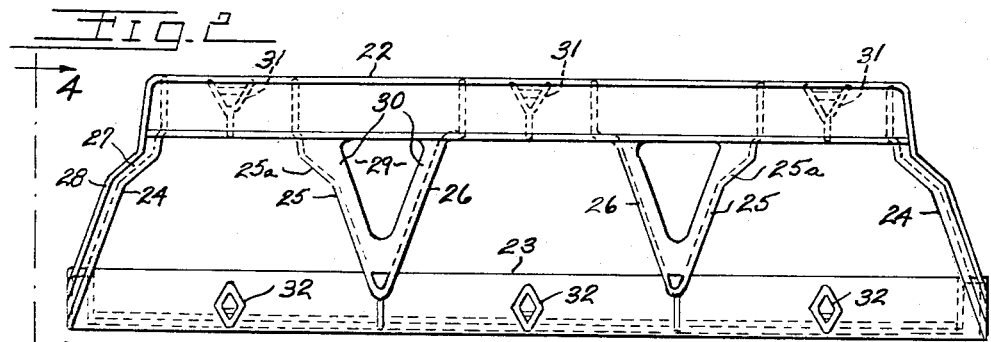
FIG. 2 is a side elevational view taken in the general direction of the line 2—2 of FIG. 1.

It has been found desirable to make tierable and nestable receptacles of the general character involved in this invention out of synthetic plastic material. The term used herein of "thin flat material" is intended to include not only such plastic material, but possibly aluminum or other sheet materials which might lend themselves to the forms herein disclosed. The receptacles of the type shown herein are presently in use in bakeries for the handling of baked goods and may reach dimensions of two and a half to three feet either direction. It is difficult to make receptacles of this size out of synthetic plastic material and still retain sufficient strength for the receptacles to carry out their desired functions and at the same time to withstand severe handling. The features of this invention are in general directed to these problems.

In the form of the invention shown in FIGS. 1 through 10, the receptacle has a generally planar bottom 20 and two upstanding generally parallel side wall members 21. These side wall members are composed partly of generally vertically extending thin flat material such as the strips 22 and 23, although it will be understood that this might be a single sheet of material in some forms of the invention. Preferably, but not necessarily, the upper strip 22 is generally channel form in section having laterally outwardly extending channel flange member 22a and 22b. This makes a stronger beam of the strip 22 as will be readily understood. Thin flange members 24, 25 and 26 are provided rigid with the strips 22 and 23 and extend laterally inwardly from the side wall members. These strips reinforce the side wall members as will be readily understood. The end flange members 24 are further reinforced by an angle structure which includes a leg 27 which is coplanar with the strip 22 and is connected at approximately right angles with another leg 28 extending laterally outwardly and is continuous with the channel flange member 22a. Preferably the members 25 and 26 are paired in V-form as clearly shown in FIG. 1. The term "V-form" as used herein does not mean that the members 25 and 26 necessarily have to meet at a sharp apex but could be slightly truncated. It will be noted in the various views that the flange members 24, 25 and 26 are rigidly secured to the laterally inward face of the strip 22 at the top and to the laterally outward face of the strip 23 at the bottom of the associated side member.

In this form of the invention it will be noted that there is a generally triangular opening 29 between the V-shape members 25 and 26. These are formed by the provision of angle members 30 at right angles to the flange members 25 and 26 which strengthen such flange members as will be understood. In another form of the invention, the opening 29 is omitted and the angle members 30 extend over the entire area 29 and preferably are coplanar with the upper strip 22.

For tiering two like receptacles one above the other, there are upper tiering support members 31 spaced along each side wall member near the upper edge and coacting lower tiering support members 32 vertically below the associated support member 31 and near the bottom of the receptacle. It will be noted in the various views that the upper tiering support members 31 are secured to and rigid with the inner face of the upper strip 22 and the lower support members 32 are secured to and rigid with the lower strip 23 on the outer face thereof. As clearly seen in FIG. 4, the side wall member is inclined upwardly and outwardly from the bottom so as to position the upper support member 31 vertically directly above the lower support member 32.

Preferably, but not necessarily, coacting means is provided on the upper and lower support members to lock the opposite side wall members of a lower receptacle against spreading laterally when an upper receptacle is tiered thereon. Each upper tiering support member, in this embodiment, has a shoulder 31a spaced inwardly from the associated side wall member strip 22, and each lower tiering support member has a projection 32a positioned to enter the space between the shoulder 31a and the associated side wall member when two like receptacles are tiered as clearly shown in FIG. 9. It should be clear that with this structure on the opposite side wall members of the receptacles, that the hook-like projection 32a entering behind the shoulders 31a and outwardly thereof on opposite sides of the lower receptacle prevent the side wall members of the lower receptacle from being forced outwardly by the load in the upper receptacle when two like receptacles are in tiered position.

Figure 3:
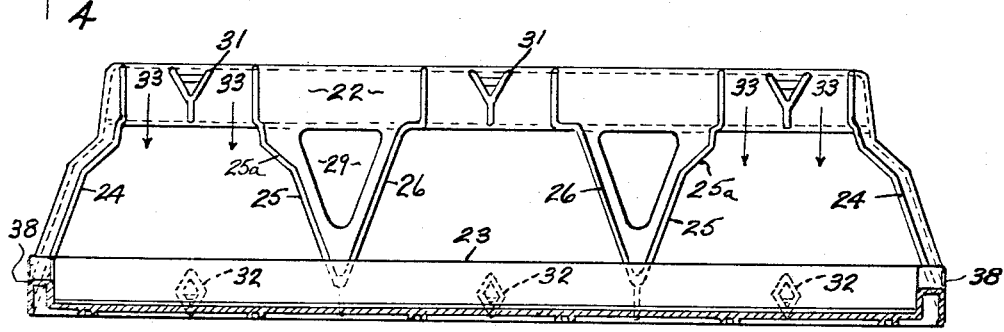
FIG. 3 is a sectional view taken along the line 3—3 of FIG. 1.

Referring to FIGS. 3, 6 and 7, it will be noted that there is a clearway 33 on each side of each upper tiering support member 31 providing sufficient space so that when the upper receptacle is raised slightly above the position of FIG. 7 just sufficient to clear the engagement between the coacting support members 31 and 32, the upper receptacle may be shifted horizontally either slightly to the left or to the right as viewed in FIG. 7, after which the lower support member 32 of the upper receptacle will pass downwardly through either of the clearways 33 in the lower receptacle, after which the upper receptacle may be moved down to nesting position in the lower receptacle in the position shown in FIG. 6. Note that in this embodiment of the invention the upper receptacle is tiered vertically in line over the lower receptacle as shown in FIG. 7 and nests vertically in line as shown in FIG. 6. When the upper receptacle of FIG. 7 is lifted slightly to disengage the tiering support members 31 and 32 and to position the lower support members 32 of the upper receptacle above either of the clearways of the lower receptacle 33, then the flange members 24 and 25 marked A, or marked B (in FIG. 1), of the lower receptacle, depending upon which clearway 33 is used, engage each other to guide the upper receptacle down toward a nesting position in the lower receptacle. The inclined shoulders 25a of flange member 25 cam a downwardly moving upper receptacle into the in-line, locked and nested position of FIG. 6.

A slight modification of this embodiment is shown in FIGS. 11 and 12 where all parts of the receptacle are like those just described in connection with FIGS. 1 through 10 except for the upper and lower tiering support members. Here the upper tiering support member 34 is generally of U-shape opening upwardly and reinforced by a vertically extending rib 34a which extends downwardly from the middle of the U-shape member and is rigid with the upper strip 22 of the side wall member, as is the tiering support member 34 itself. The modification here comprises a keeper projection 34b extending generally parallel to the side wall member from one of the legs of the U-shape member and spaced above the bottom of the U-shape member to coact with the lower tiering support member of a like receptacle. The lower tiering support member 35 vertically below the upper support member 34 extends outwardly from the side wall member strip 23 and is provided with two oppositely extending hooks 35a which extend generally parallel to the side wall member. As shown in the enlarged view in FIG. 12, when two like receptacles are tiered, one of the hooks 35a of the lower tiering support member of the upper receptacle is adapted to enter beneath the keeper projection 34b of the upper support member of the upper receptacle so as to resist separation of the two tiered receptacles in a vertical direction. Preferably, but not necessarily, the distance between the free end of the projection 34b and the opposite arm of the U-shape member 34 is only slightly greater than the distance horizontally between the oppositely extending hooks 35a so as to permit the entry of the hooks downwardly past the projection 34b but to make it a little more difficult to remove the upper receptacle upwardly from the tiered position of FIG. 12.

No detailed description is particularly necessary of the bottom 20 of this receptacle inasmuch as it could take various forms. The form here shown comprises a generally rectangular frame 36 extending continuously around the perimeter of the bottom and open structure in the central portion of the bottom which comprises crossing ribs at right angles to each other and interconnected by diagonal ribs as clearly shown in FIGS. 1 and 5. A stronger construction is provided by giving a channel form to these ribs in the bottom as clearly shown at 37 in FIG. 10. The end edges of the bottom at 38, at right angles to the side wall members, are preferably of channel form construction as clearly shown in FIG. 10. Where these end edge members join the side wall members, they are preferably made somewhat deeper as indicated at 38a and rigidly join to the side wall in a manner to strengthen the side walls against spreading outwardly away from the bottom of the receptacle. Referring to FIGS. 8 and 9, the opposite ends of the bottom end edge members as at 38a are hollow and a tongue 23a integral with the side wall strip member 23 extends at right angles to the side wall member and fits snugly into the hollow portion of 38a. There it is securely and rigidly fastened either by adhesive or by mechanical fasteners, rivet fasteners being indicated at 39.

In another manner the bond between the bottom 20 and the side wall member is rendered stronger throughout the length of each side wall member by having a tongue and groove fit as indicated at 40. A pair of spaced groove forming channels 41 are formed integrally with the strip 23 and receive between them the edge portion 36 of the bottom 20. The channels 41 also strengthen the side wall member against lateral bending. Preferably, but not necessarily, some adhesive or binding material is provided at the tongue and groove joint 40 to strengthen the structure at this point.

The operation of the receptacles thus far described should now be apparent. For tiering two like receptacles in the position of FIG. 7, the upper receptacle is held with its bottom horizontal over the lower receptacle while the projections 32a of the lower tiering support portions of the upper receptacle are engaged behind the shoulders 31a of the upper tiering support members 31 of the lower receptacle. Alternatively, the hooks 35a of FIGS. 11 and 12 may be engaged below the keeper projections 34b of the lower receptacle. To move from the tiering position of FIG. 7 to the nested postion of FIG. 6, the upper receptacle is lifted just sufficiently to clear the support members 31 and 32, or 34 and 35, after which the upper receptacle is shifted horizontally a slight distance until the lower support members of the upper receptacle are vertically above the clearways 33 of the lower receptacle. Then the upper receptacle is moved down to nested position in the lower receptacle in the position shown in FIG. 6 whereupon the lower support portions 32 move into a position vertically in line with each other as to the two receptacles. During this nesting action, either the flange members 24 and 25 of the two receptacles, marked A in FIG. 1, or the similar flange members of the two receptacles, marked B in FIG. 1, aid in guiding the upper receptacle to nesting position, depending upon whether the clearway 33 used is to the right or to the left of the support member 31. The nesting action stops when the strips 22 and 23 of the upper receptacle engage the similar strips of the lower receptacle. Endwise movement of the two nested receptacles is limited by the engagement of the like flange members 24 and 25 of the two receptacles as indicated at the points 42 and 43 of FIG. 6.

Note in FIG. 6 that the flange portions 24b, 25b and 26b, in the nested position of a plurality of receptacles, are vertically in line with like parts of all receptacles in the nested group so as to form substantially continuous walls along the side of each clearway opposite tiering support 31. Thus, when moving the upper receptacle of FIG. 6 upwardly out of the lower one, the pointed upper end of member 32 of the upper receptacle will be cammed by the downwardly extending flange 31b of member 31 of the lower receptacle right or left into a clearway 33 and thus diverted by Y-shape member 31 toward a wall 24b, 25b or 26b.

The embodiment shown in FIGS. 13 through 17 is similar to that already described and only those parts having a different form or function will be described. Here the side wall member upper strips 22' and lower strips 23' are deeper in vertical dimension than those in the previous embodiment. Also second V-forming flange members 250 and 260 are provided outside and generally parallel to the flange members 26' and 25' which more nearly resemble the first described form. Members 50 at the right side of FIG. 13 and 60 at the left-hand side perform functions analogous to flanges 250 and 260 respectively. V-forms 25', 26', 250, 260 are rigidly tied together at the top by strip 22' and at the bottom by strip 23'. Additional flange members 45 are provided and preferably connected to the flanges 46 which extend vertically upward to each upper tiering support member 51, 52 to block off the space below members 52 and guide a lower receptacle smoothly into clearway 33' as it moves upwardly out of a nesting position. Other connecting flange members 47 and 48 are provided as shown in FIG. 13. The portions 240 and 280 are similar to those indicated at 24 and 28 in the first described embodiment. The bottom end edge members 38' are similar to those described at 38 in the first embodiment except that one or both of them may be substantially vertically as deep as the strip 23' along the side wall members. As seen in FIG. 22, hollow wall 38' which is generally V-shape opening downwardly, may be strengthened by spaced ribs 38a' connected between the parallel vertical walls of the member.

Note that legs 27' and 28' at each end of the side wall member are like legs 27 and 28 of the first described embodiment but leg or flange 28' extends laterally outwardly along the entire length of strip 22' for strength and stiffening. Also strip 22' has outwardly extending horizontal reinforcing ribs or flanges 61 and 62.

In this form of the invention, there is also a different structure in the tiering support members. Referring to FIGS. 13, 16 and 21, each upper tiering support member 51 is generally U-shaped opening upwardly and provided with a keeper projection 51a projecting inwardly from one arm of the U-shape formation. Adjacent this projection is a slide 52 slightly inclined upwardly and away from the projection as clearly shown in FIG. 16. Each side is longitudinally aligned with its associated projection and all of the slides in a given receptacle are inclined in one direction, that is, toward the same end of the receptacle. Preferably, as seen in FIG. 21, each slide 52 is tapered laterally outwardly away from 51a as indicated at 52a, and corners are rounded at 52b to aid in easy shifting of an upper receptacle relative to a lower receptacle between tiering and nesting positions.

In this form of the invention, each of the lower tiering support members 53 has a hook 54 at the lower end thereof adapted to enter into the upper tiering support member 51 with the hook engaging beneath the projection 51a as clearly shown in FIG. 16. The walls of the U-shape member 51 urge the hook 54 to its engaged position beneath the projection 51a. In this engaged position, the parts resist separation of an upper tiered receptacle from the lower tiered receptacle.

In this embodiment, a clearway 33' is seen at the left-hand side of each of the upper tiering support members in FIG. 13 serving the purpose of the clearway 33 of the first described embodiment.

As clearly shown in FIGS. 14 and 15, a tongue 23a' rigid with the side wall member strip 23' enters into a receiving recess in the end edge wall member 38' and is fastened therein by rivet 39' for the same purpose as the tongues 23a entering the recesses 38a and secured by rivets 39 in the first described embodiment. A tongue and groove connection 40' is provided between the bottom and the side wall members as clearly shown in FIGS. 14 and 15.

The operation of this embodiment should now be clear. With two like receptacles in vertically aligned tiered relationship as shown in FIG. 13, the upper receptacle is lifted slightly sufficiently to clear the engaged tiering support members after which the upper receptacle is moved toward the left horizontally as viewed in FIG. 13 until the lower support members thereof 53 are vertically aligned with the clearways 33' in the lower receptacle. The upper receptacle is then moved down to a nested position in the lower receptacle as shown in FIG. 17. During this nesting action the flange members 250 of the upper receptacle coact with the flange members 25' of the lower receptacle in guiding the nesting action and the shoulders 250a cam the parts 54 of the upper receptacle vertically into line over coacting parts 51 of the lower receptacle. The nesting terminates when the end edge strips 38' of the two receptacles come together as shown in FIG. 17. Relative endwise movement between two nested receptacles is prevented by engagement of the reinforcing flange members of the two receptacles.

If desired, shallowfoot members 55 may be molded on the under side of the bottom near the four corners of the receptacle. Recesses in the mold for forming these members may be filled in if the feet members are not desired.

In FIGS. 18 and 19 I have shown how additional reinforcing may be supplied between the side wall members and the bottom where the side wall members join the end edge members of the bottom. I have shown a reinforcing wall 56 in full lines in FIG. 18 and a sectional view in FIG. 19. Here the end flange member 240' is in the same position as the flange member 240 of FIGS. 13 through 17 and the side wall strip is extended longitudinally therebeyond as indicated at 22'' in FIG. 19. This same structure may be provided at the two right-hand corners of the receptacle as viewed in FIG. 17. The reinforcing wall 56 slopes inwardly and downwardly from the upper edge of the side wall extension 22'' and its lower end is secured to the bottom end wall 38'' by a tongue 58 of the bottom end wall member 38'' entering into the hollow portion 59 of the side wall member and secured thereto by rivets 60 to strengthen this corner as in the other described embodiments. At the left-hand corners, as viewed in FIG. 17, the broken line construction seen at 56' in FIG. 18 (together with a side wall extension 22'') may be provided to give room for shifting an upper receptacle toward that end to enter the clearways 33' when moving toward nested position. Preferably also a tongue and groove arrangement is provided at 40'' between the bottom of the receptacle and each side wall member as previously described. Other than these differences, the structure of the receptacles of FIGS. 18 and 19 is almost exactly like that shown in FIGS. 13 through 17.

In FIG. 23 is shown another manner of firmly connecting the bottom to the side wall members. Here one of the side wall members is indicated at 210 having extending along substantially the full length of its bottom edge generally parallel groove forming flanges 211 to receive one of the edges of the rectangular bottom member 200. The groove forming members are provided with inwardly directed shoulders 211a opposite each other and extending along the entire length of the side member. The edge of the bottom member 200 is provided with complementary opposing recesses 200a. The portions 211 are formed of resilient material, such as a suitable plastic, and when the bottom member is inserted to the bottom of the recess in the side wall member 210, the parts 211a snap into the recesses 200a so that a rigid joint is formed here without the use of adhesive.

FIG. 20 represents the simplicity of the structure of the receptacle of this invention. Here, each side wall member 21 is a unitary molding and one is a mirror image of the other. The bottom 20 with its end edge members 38' is the third member of the assembly. The assembly operation requires merely the inserting of the tongue 23a' at each end of each side member into the hollow recess in the bottom end edge member 38' while the tongue and groove connection is completed where the opposite lateral edges of the bottom member enter into the coacting groove extending along the bottom of each of the side wall members. By adhesive or fastening means the bottom member and side wall members are permanently secured together as previously described using either adhesive or bolts or rivets to secure the tongues 23a' in place and using adhesive or the structure of FIG. 23, or both, to secure the tongue and groove connection between the lateral edges of the bottom member and the bottom edges of the side wall members. This construction gives a very cheap molding operation and a very simple assembling operation.

What is claimed is:

1. A receptacle having a generally planar bottom and opposite parallel side wall members having vertically inclined parts adapted to nest with like vertically inclined parts of side wall members of a like receptacle, pairs of upper and lower tiering support members spaced along each said side wall member, the support member of each pair being vertically aligned, at least some of said lower support members having a pair of hooks oppositely directed and generally parallel to the associated side wall member, and coacting upper tiering support members generally U-shape opening upwardly and having a keeper projection spaced above the bottom of said upper support member to receive one of said hooks thereunder when two like receptacles are tiered, said keeper projection extending from one wall of said U-shape toward the other and having a clear opening between said keeper and said other wall not substantially greater than the dimension across said two hooks.

2. A receptacle having a generally planar bottom and opposite parallel side wall members having vertically inclined parts adapted to nest with like vertically inclined parts of side wall members of a like receptacle, pairs of upper and lower tiering support members spaced along each said side wall member, the support members of each pair being vertically aligned, at least some of said lower support members having a hook extending generally parallel to the associated side wall member, coacting upper tiering support members opening upwardly and having a keeper projection extending from one side of said upper support member inwardly and spaced above the bottom thereof to receive said hook thereunder, and slides associated with said upper tiering support members longitudinally aligned with said projections, each slide inclined upwardly and away from its associated support member and all extending toward one end of said receptacle, whereby said hooks may be guided down said slides and into said upper tiering support members.

3. A receptacle having a generally planar bottom and opposite parallel side wall members of generally vertically extending thin flat material, said side wall members having thin flange members extending at right angles to said side wall members and rigid therewith, said flange members reinforcing said side wall members, each of said side wall members comprising a strip near the bottom and a second strip spaced therefrom near the upper edge of said receptacle, both of said strips extending substantially the full length of said receptacle, said thin flange members including end flange members at opposite ends of each side wall member and inclined inwardly and upwardly toward each other, and said thin flange members including a plurality of V-shape members intermediate said end flange members, whereby said end flange members and said V-shape members together with said strips near the bottom and near the upper edge form a truss-like structure.

4. A receptacle as defined in claim 3, wherein said flange members include a second V-shape member generally parallel and outside of each of said first named V-shape members, and said second V-shape member engaging said first named V-shape member when two like receptacles are nested.

5. A receptacle having a generally planar bottom and opposite parallel side wall members of generally vertically extending thin flat material, said side wall members having thin flange members extending at right angles to said side wall members and rigid therewith, said flange members reinforcing said side wall members, each of said side wall members comprising a strip near the bottom and a second strip spaced therefrom near the upper edge of said receptacle, both of said strips extending substantially the full length of said receptacle, said strip near the bottom being on the side of said flange members toward the inside of the receptacle, said strip near the upper edge being on the side of said flange members toward the outside of the receptacle, and said side wall members being inclined outwardly permitting an upper receptacle to nest downwardly into a like receptacle with their associated strips near the bottom in vertical alignment.

6. A receptacle as defined in claim 5, wherein said strips near the upper edge are channel-form with a web thereof generally vertical and upper and lower channel flanges extending away from said receptacle.

7. A receptacle as defined in claim 6, wherein said flange members include a plurality of V-shape members associated with each side wall member and each V-shape member adapted to nest downwardly into a similar V-shape member of a like receptacle.

8. A receptacle as defined in claim 7, including angle members at right angles to said V-shape members and rigid therewith, said angle members being approximately coplanar with the web of said channel-form strip.

9. A receptacle as defined in claim 7, including web members at right angles to said V-shape members and rigid therewith, said web members being approximately coplanar with the web of said channel-form strip.

10. A receptacle having a generally planar bottom and opposite parallel side wall members of generally vertically extending thin flat material, said side wall members having thin flange members extending at right angles to said side wall members and rigid therewith, said flange members reinforcing said side wall members, said receptacle including spaced along each side wall member upper tiering support members and coacting lower tiering support members respectively vertically below the associated upper support members, said support members rigid with the associated side wall member, each said upper support member on the inside of the associated side wall member and each said lower support member on the outside thereof, each said side wall member being inclined upwardly and outwardly from the bottom sufficiently to position its associated upper support member directly vertically above the coacting lower support member, each said upper tiering support member having a shoulder spaced inwardly from the associated side wall member, and each said lower tiering support member having a projection positioned to enter said space between said shoulder and said side wall member when two like receptacles are tiered, whereby said engaged shoulders and projections prevent any substantial relative movement laterally of the side wall members of the lower of the two tiered receptacles.

11. A receptacle having a generally planar bottom and opposite parallel side wall members of generally vertically extending thin flat material, said side wall members having thin flange members extending at right angles to said side wall members and rigid therewith, said flange members reinforcing said side wall members, said flange members being inclined from top to bottom longitudinally of the associated side wall members for guiding an upper receptacle downwardly into a lower like receptacle to a nested position therein, upper tiering support members being provided near the upper edge of each side wall member and between said flange members, lower tiering support members near the bottom of each side wall member and vertically below associated upper tiering support members, and there being a clearway on at least one side of each upper tiering support member between such support member and an adjacent flange member permitting passage of a lower tiering support member of an upper receptacle downwardly in said clearway of a lower receptacle to a nested position.

12. A receptacle as defined in claim 11, wherein said flange members are V-shape opening upwardly, said clearways are provided on opposite sides of each upper tiering support member, and said support members and flange members are so positioned that when a lower tiering support member of an upper receptacle is placed in one of said clearways of a lower receptacle the V-shape flange member of an upper receptacle is positioned to enter downwardly into a corresponding V-shape flange member of the lower receptacle to guide the upper receptacle to a nested position in the lower receptacle.

13. A receptacle having a generally planar bottom and opposite parallel side wall members of generally vertically extending thin flat material, said side wall members having thin flange members extending at right angles to said side wall members and rigid therewith, said flange members reinforcing said side wall members, said receptacle including spaced along each side wall member upper tiering support members and coacting lower tiering support members respectively vertically below the associated upper support members, said support members rigid with the associated side wall member, each said upper support member on the inside of the associated side wall member and each said lower support member on the outside thereof, each said side wall member being inclined upwardly and outwardly from the bottom sufficiently to position its associated upper support member directly vertically above the coacting lower support member, a lower tiering support member having a hook extending generally parallel to the associated side wall member, and the coacting upper tiering support member having a keeper adapted to coact with said hook when two like receptacles are tiered and to resist separation of said tiered receptacles.

14. A receptacle having a generally planar bottom and opposite parallel side wall members of generally vertically extending thin flat material, said side wall members having thin flange members extending at right angles to said side wall members and rigid therewith, said flange members reinforcing said side wall members, said bottom being separate from said side wall members and having end edges approximately aligned with the ends of said side wall members, the bottom securing members on said end edges interengaged with said side wall members by providing one of said members with a tongue and the other of said members with a recess snugly receiving said tongue, and means firmly securing said tongues in said recesses.

15. A receptacle is defined in claim 14, including a tight tongue, and means firmly securing said tongues in said of said side wall members extending substantially the entire length of the latter, said tongue and groove joint members also reinforcing the associated side wall member against lateral bending.

16. A receptacle having a generally planar bottom and opposite parallel side wall members of generally vertically extending thin flat material, said side wall members having thin flange members extending at right angles to said side wall members and rigid therewith, said flange members reinforcing said side wall members, said bottom having end edge walls extending between said side wall members, and reinforcing walls at each end of each side wall member extending from near the upper edge of the associated side wall member downwardly and inwardly to the associated end edge wall and rigidly secured to each of them.

17. A receptacle having side walls whose parts are inclined to the vertical so as to nest with a like receptacle, and having on the side walls upper tiering support members near the top directly vertically above lower tiering support members near the bottom and adapted to tier with a like receptacle and consisting solely of a planar bottom member and two opposite side wall members, each of said members being a unitary molding, and interfitting parts rigidly connecting said side walls members to opposite sides of said bottom member.

18. A receptacle as defined in claim 17 including interfitting tongue parts and groove parts connecting said bottom member and side wall members and extending substantially the entire length of said side wall members.

19. A receptacle as defined in claim 18 including projections on one of said tongue and groove parts and recesses on the other of said parts positioned to receive said projections when said parts are assembled, and said groove parts being resilient whereby said projections snap into said recesses and are held there.

References Cited

UNITED STATES PATENTS

| | | |
|---|---|---|
| 2,878,959 | 3/1959 | Nawman. |
| 3,219,232 | 11/1965 | Wilson _____ 211—126 X |
| 3,245,548 | 4/1966 | Kesilman et al. ____ 211—126 X |
| 3,319,799 | 5/1967 | Paxton _____ 211—126 |

FOREIGN PATENTS

| | | |
|---|---|---|
| 961,680 | 6/1964 | Great Britain. |

ROY D. FRAZIER, *Primary Examiner.*

W. D. LOULAN, *Assistant Examiner.*